Figure 1:
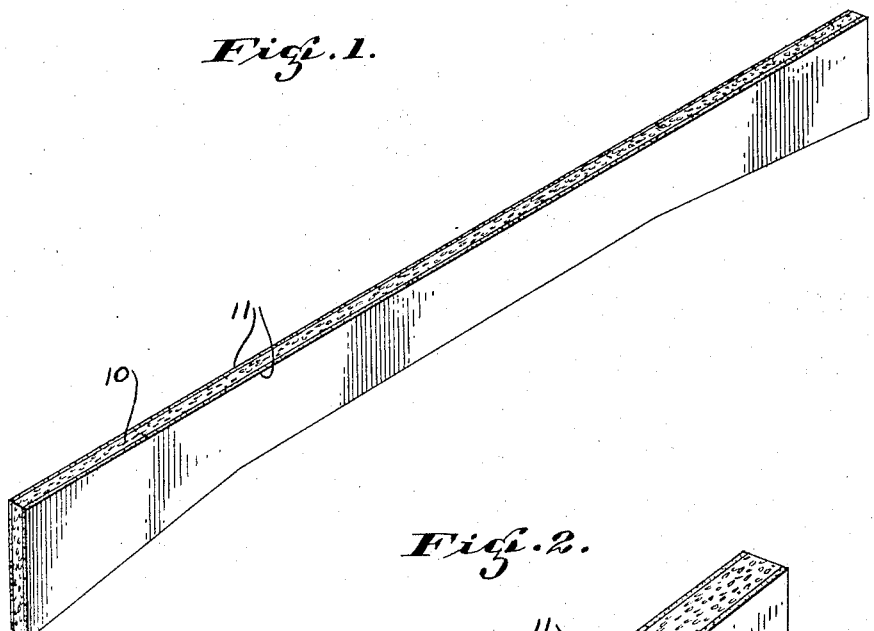

Oct. 8, 1935.    L. E. WARNER    2,016,404

PAVEMENT JOINT PACKING

Filed April 3, 1929

INVENTOR.
Leroy Elmer Warner.
BY
Townsend, Loftus + Abbett
ATTORNEYS.

Patented Oct. 8, 1935

2,016,404

UNITED STATES PATENT OFFICE 2,016,404

PAVEMENT JOINT PACKING

Leroy Elmer Warner, Oakland, Calif., assignor, by mesne assignments, to Construction Materials Patents, Inc., a corporation of Ohio Application April 3, 1929, Serial No. 352,117

26 Claims. (Cl. 94—18)

My present invention relates to pavement joint packing and more particularly to an expansible packing which is particularly adapted to concrete pavements.

An object of my invention is to provide a joint packing or expansion joint filler for concrete pavements and the like which will have a maximum of elasticity and be substantially waterproof.

A further object of my invention is to provide a yielding spacer or expansion joint filler for concrete pavements having a predominating characteristic with respect to elasticity corresponding to that of rubber.

Another object of my invention is to provide a packing for roads consisting of a porous cellular structure containing at least 40% rubber.

A further object of my invention is to provide a packing of the above character which may be flexed to a greater extent than has heretofore been found possible in articles of this character without breaking.

Another object of my invention is to provide an improved method for producing packings of the character contemplated by my invention.

In carrying out my invention I propose to make my improved packing from a material formed by an admixture of materials of which at least 40% by weight is of rubber and working the same into a porous, cellular mass so that a maximum degree of elasticity will be imparted thereto. More specifically, my invention contemplates a packing material composed of substantially 40% pure or reclaimed rubber, 7% Petrolastic X (mineral rubber, i. e., asphaltum), substantially 1% wool grease, 46% Belgium whiting, 3% sulphur, and 2% ammonium carbonate. The above ingredients are worked in a rubber mill to a porous, cellular mass and then rolled into sheets of suitable thickness. These sheets are then cut into suitable shapes and sizes and a layer of felt, preferably asphalt saturated, is then placed upon both sides thereof and the whole is then placed in a suitable press and cured under pressure with heat treatment. The above sheets, before the heat treatment, are rolled to a thickness substantially one-half that desired in the final product. This is because, as a result of the heat treatment, the material will expand to a thickness corresponding substantially to that desired or, in other words, to a thickness substantially twice that of the uncured sheet. In addition to the expansion and curing of the mixture, I have also found that the heat treatment serves to firmly secure the felting applied to the surface thereof so that when the heat treatment is completed, the felting will adhere to the porous, cellular portion of the packing.

The rubber ingredient of my improved wedge may be of pure rubber or reclaimed rubber. I have found that reclaimed rubber is considerably cheaper than pure rubber and is equally suited to my purposes. The function of the wool grease specified in the above composition is for the purpose of facilitating a flowing of the materials during the milling operation. The Belgium whiting functions in the nature of a filler, the sulphur as a vulcanizing agent, and as far as I have been able to determine, the ammonium carbonate creates a gas which is responsible for the porous, cellular structure of the finished product.

Figure 2:
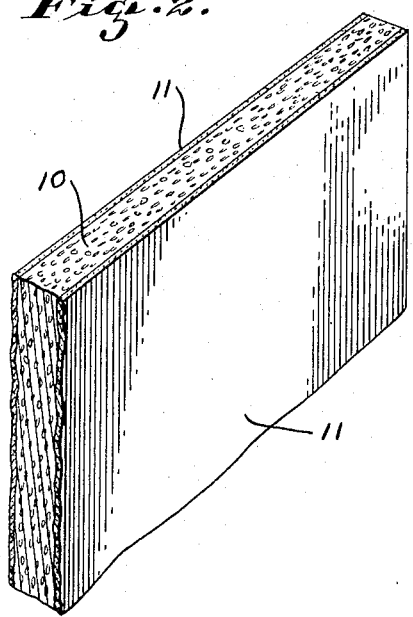

In order that a better understanding of the construction of my improved packing may be had, I have shown in Fig. 1 of the accompanying drawing a complete packing constructed in accordance with my invention, and in Fig. 2 an enlarged, fragmentary portion thereof.

In the drawing, 10 designates the central portion of my packing which is composed of the ingredients set forth above and 11 designates suitable sheets of felting material which become securely affixed against the sides of the material 10 as a result of the heat treatment.

In the application of my invention to concrete pavements and the like, it will be found that it possesses many features of advantage which are not possessed by similar articles now available. Among these advantages may be cited the following: It is, because of the high rubber content that it contains, extremely impervious to moisture and, as a result, it has a comparatively long life. It will also be found to possess a greater amount of flexibility than present day articles of similar character. This flexibility is not only with respect to its compressibility and expansibility, but also with respect to flexing, which can be effected to a certain degree both flatwise and edgewise. The limitation with respect to these latter flexings is because of the felt and the limit of this flexing may be carried out to a point where the felt would not rupture. In other words, if it were not for the felt facings of my improved packing, it might be flexed to almost any configuration as the porous cellular material 10 has characteristics somewhat similar to sponge rubber. Another great advantage of my packing is that it is comparatively soft and can be cut to almost any size or shape without any special tools.

In addition to the above desirable characteristics, I have also found by actual experiment that packings constructed in accordance with my invention may be compressed to less than one-half of their original thickness without their taking a permanent set; in fact, in tests which I have carried out, I have compressed packings of this character to one-half of their original thickness and have found that they, when released, return to substantially their original thickness. These tests also show that packings constructed as disclosed above are substantially free from extension or, in other words, any tendency to flow out of the joint when they are compressed, such as would be the case with a plastic material. This latter feature I attribute to the porosity of the structure.

While I have shown the preferred form of my invention as now known to me, it is to be understood that various changes may be made in its construction without departing from the spirit of the invention as defined in the appended claims.

Having thus described my invention, what I claim and desire to secure by Letters Patent is—

1. A packing for paving joints having the following ingredients by weight, at least 40% rubber, 7% asphaltum, and 46% whiting, all of said ingredients being worked into a porous mass and cured by heat treatment.

2. A packing for paving joints comprising layers of felted material having a porous yielding mass therebetween containing at least 40% rubber.

3. The herein described method of producing expansion joint packings which consists in milling rubber, asphaltum and whiting in the presence of sulphur and ammonium carbonate, whereby a spongy mass is produced, rolling said mass into suitable dimensions and curing the same with heat.

4. The herein described method of producing expansion joint packings which consists in milling the following materials in the proportions indicated: rubber not less than 40%, asphaltum 7%, wool grease 1%, Belgium whiting 46%, sulphur 3%, ammonium carbonate 2%; forming the mixture into suitable sheets, applying felt to both sides thereof and curing the same under heat treatment, whereby a yielding porous packing will be produced.

5. A packing for paving joints having the following ingredients by weight: at least 40% rubber, 7% asphaltum, and 46% whiting; all of said ingredients being worked into a porous mass and cured under pressure by heat treatment in the presence of sulphur and ammonium carbonate.

6. A packing for paving joints comprising layers of felted material having a porous yielding mass therebetween containing at least 40% rubber, 7% asphaltum, and 46% a filler of suitable material.

7. The herein described method of producing expansion joint packings which consists in milling rubber, asphaltum and whiting in the presence of sulphur and ammonium carbonate, whereby a spongy mass is produced, rolling said mass into suitable dimensions and curing the same under pressure with heat.

8. The herein described method of producing expansion joint packings which consists in milling the following materials in the proportions indicated: rubber not less than 40%, asphaltum 7%, wool grease 1%, Belgium whiting 46%, sulphur 3%, ammonium carbonate 2%; forming the mixture into suitable sheets, applying felt to both sides thereof and curing the same under heat and pressure, whereby a yielding porous packing will be produced.

9. A packing for paving joints comprising a strip of cured porous sponge rubber having thin layers of felted material secured to the sides thereof.

10. In a preformed packing for paving joints an elastic strip formed from a mixture containing rubber, asphalt and a filler, and means vulcanized to said strip limiting the flexibility of said packing.

11. In a preformed packing for paving joints a cellular rubber strip, a layer vulcanized to said strip limiting the flexibility thereof.

12. In a preformed packing for paving joints a rubber strip, a layer of suitable material limiting the flexibility of said rubber strip vulcanized to said rubber strip.

13. In a preformed packing for paving joints a rubber strip, a layer of bituminous saturated felt limiting the flexibility of said strip vulcanized to said strip.

14. A preformed packing for paving joints comprising a layer of felted material, a layer of cured rubber, said felted material and rubber being vulcanized together.

15. The method of producing an expansion joint consisting in forming a mixture containing rubber, asphalt and a filler, forming the mixture into a sheet, bringing said sheet into contact with a bituminous saturated felt, curing the mixture by heat while in contact with said felt, thereby forming a yielding cellular expansion joint having means limiting its flexibility.

16. An expansion joint material composed of a resilient elastic cellular body containing rubber and having on its surface suitable sheet material saturated with a waterproofing material.

17. An expansion joint material composed of a resilient elastic cellular body containing rubber and having on a face thereof felt saturated with a waterproofing material.

18. A constructional strip adapted for use in building or paving construction comprising a rubber core and bituminized fibrous layers applied to reenforce and protect the same.

19. An expansion joint strip comprising a rubber core and bituminized fibrous layers applied to reenforce and protect the core.

20. An expansion joint filler consisting of a slab like material having a body of resilient rubber material containing innumerable independent air cells and a body of bituminous material arranged in layers.

21. An expansion joint consisting of a slab like material having a core containing rubber and innumerable air cells, a waterproof air proof protective casing on the side of said core.

22. An expansion joint consisting of a slab like material having a cellular body of rubber material and a reenforcement of saturated felt.

23. In a paving construction adjacent bodies having characteristics of expanding and contracting under changing temperature conditions, a filler between said bodies composed of a resilient rubber body, and bituminous means sealing the edge of said filler between the adjacent bodies.

24. The method of producing expansion joint which comprises producing a mixture of ingredients including rubber, asphalt, and a gas producing agent, treating the mixture to release gas and form a cellular body, and providing said body with waterproof sides.

25. A preformed expansion joint for use in building or paving construction comprising an elastic cellular body containing rubber and having bituminized fibrous waterproof sides.

26. A preformed expansion joint for use in building or paving construction comprising an elastic cellular body containing rubber, asphalt and a filler and having waterproof sides.

LEROY ELMER WARNER.